United States Patent [19]

Toelke

[11] Patent Number: 4,646,559

[45] Date of Patent: Mar. 3, 1987

[54] APPARATUS AND METHOD TO TEST A SINGLE CONNECTION BETWEEN A PIPE COUPLING AND A SINGLE PIPE END CONNECTED THEREWITH

[75] Inventor: Lester W. Toelke, Bellville, Tex.

[73] Assignee: Jack W. Hayden, Houston, Tex.

[21] Appl. No.: 693,578

[22] Filed: Jan. 22, 1985

[51] Int. Cl.$^4$ ............................................. G01M 3/28
[52] U.S. Cl. ........................................ 73/46; 73/49.8
[58] Field of Search ................ 73/46, 49.1, 49.5, 49.6, 73/49.8; 138/90

[56] References Cited

U.S. PATENT DOCUMENTS

| | | | |
|---|---|---|---|
| 2,035,925 | 3/1936 | Seamark | 236/16 |
| 2,155,602 | 4/1939 | Keulers | 138/90 |
| 2,241,526 | 5/1941 | Rosenkranz | 138/90 |
| 2,368,928 | 2/1945 | King | 166/10 |
| 2,663,183 | 12/1953 | Huhn | 73/46 |
| 2,671,338 | 3/1954 | Reichl | 73/37 |
| 2,695,632 | 11/1954 | Brock | 73/46 X |
| 2,707,388 | 5/1950 | Kent | 73/37 |
| 2,780,294 | 2/1957 | Loomis | 166/203 |
| 3,038,542 | 6/1962 | Loomis | 166/204 |
| 3,095,729 | 7/1963 | McConnell | 73/49.1 |
| 3,179,127 | 4/1965 | Terry | 138/90 |
| 3,331,238 | 7/1967 | Kost et al. | 73/19.5 |
| 3,371,521 | 3/1968 | Hauk | 73/46 |
| 3,464,708 | 9/1969 | Hamilton | 277/151 |
| 3,710,628 | 1/1973 | Horton | 73/49.5 |
| 3,803,901 | 4/1974 | McConnell et al. | 73/49.8 |
| 3,879,039 | 7/1975 | Le Rouax | 251/1 |
| 4,010,633 | 3/1977 | Hasha | 73/46 |
| 4,085,942 | 4/1978 | Yoshida et al. | 277/30 |
| 4,254,655 | 3/1981 | Keast et al. | 73/49.5 |
| 4,362,049 | 12/1982 | Horton | 73/49.6 |
| 4,377,185 | 3/1983 | Katz | 138/90 |
| 4,416,147 | 10/1983 | Hasha | 73/49.6 |
| 4,430,887 | 2/1984 | Roberts et al. | 73/49.8 |
| 4,458,522 | 7/1974 | Toelke | 73/49.5 |

Primary Examiner—Jerry W. Myracle
Assistant Examiner—Joseph W. Roskos
Attorney, Agent, or Firm—Jack W. Hayden

[57] ABSTRACT

A body is provided with longitudinally spaced first and second annular grooves for receiving first and second longitudinally spaced annularly spaced seal and lock ring segment assemblies therein to sealingly engage and lock with a pipe coupling and a single pipe end engaged therewith for forming a fluid receiving test chamber that extends across the single connection between the pipe end and the coupling. A fluid passage in the body conducts fluid to move said first and second seal and lock ring segment assemblies into sealing and locking engagement with the pipe and coupling, respectively, to form the fluid receiving test chamber. A second passage conducts fluid to the chamber for testing the single connection between the members from inside the members to the exterior thereof through the single connection. A leak in the connection is determined by instrumentally noting a pressure drop in the chamber or by visually noting leakage of fluid at the connected pipe coupling end.

12 Claims, 8 Drawing Figures

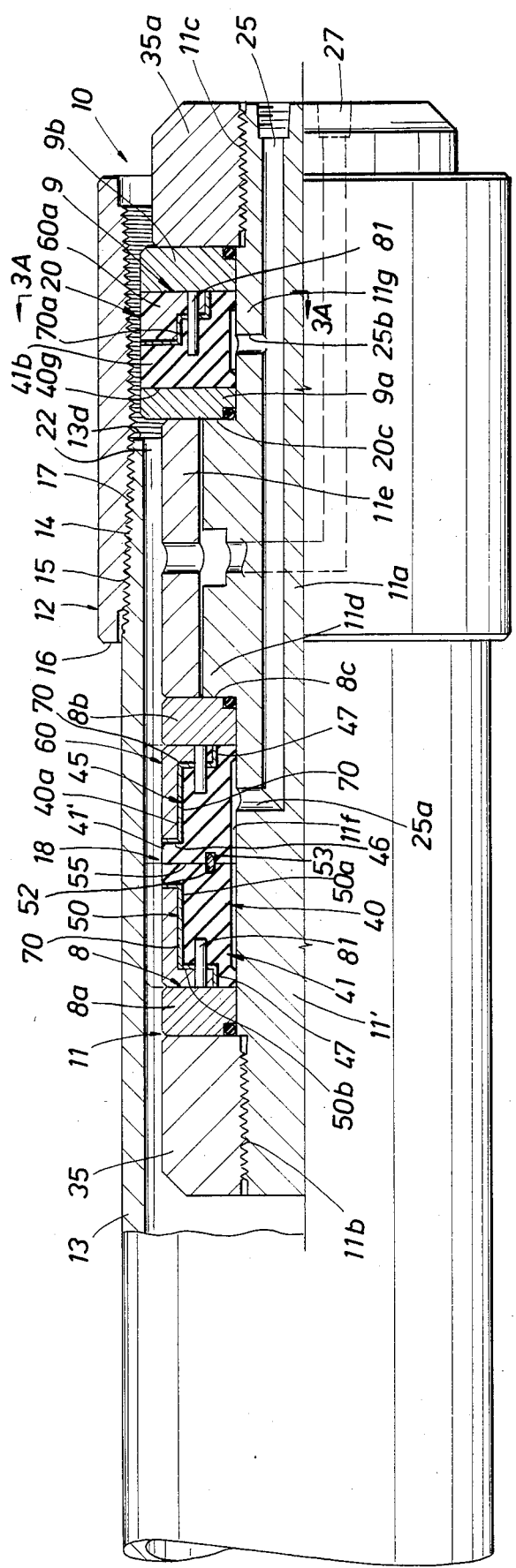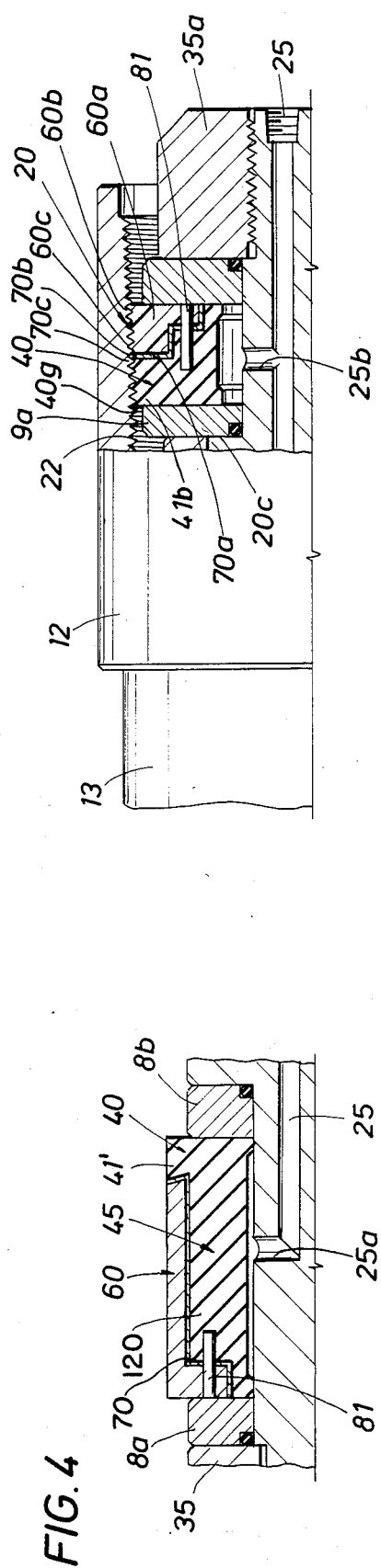

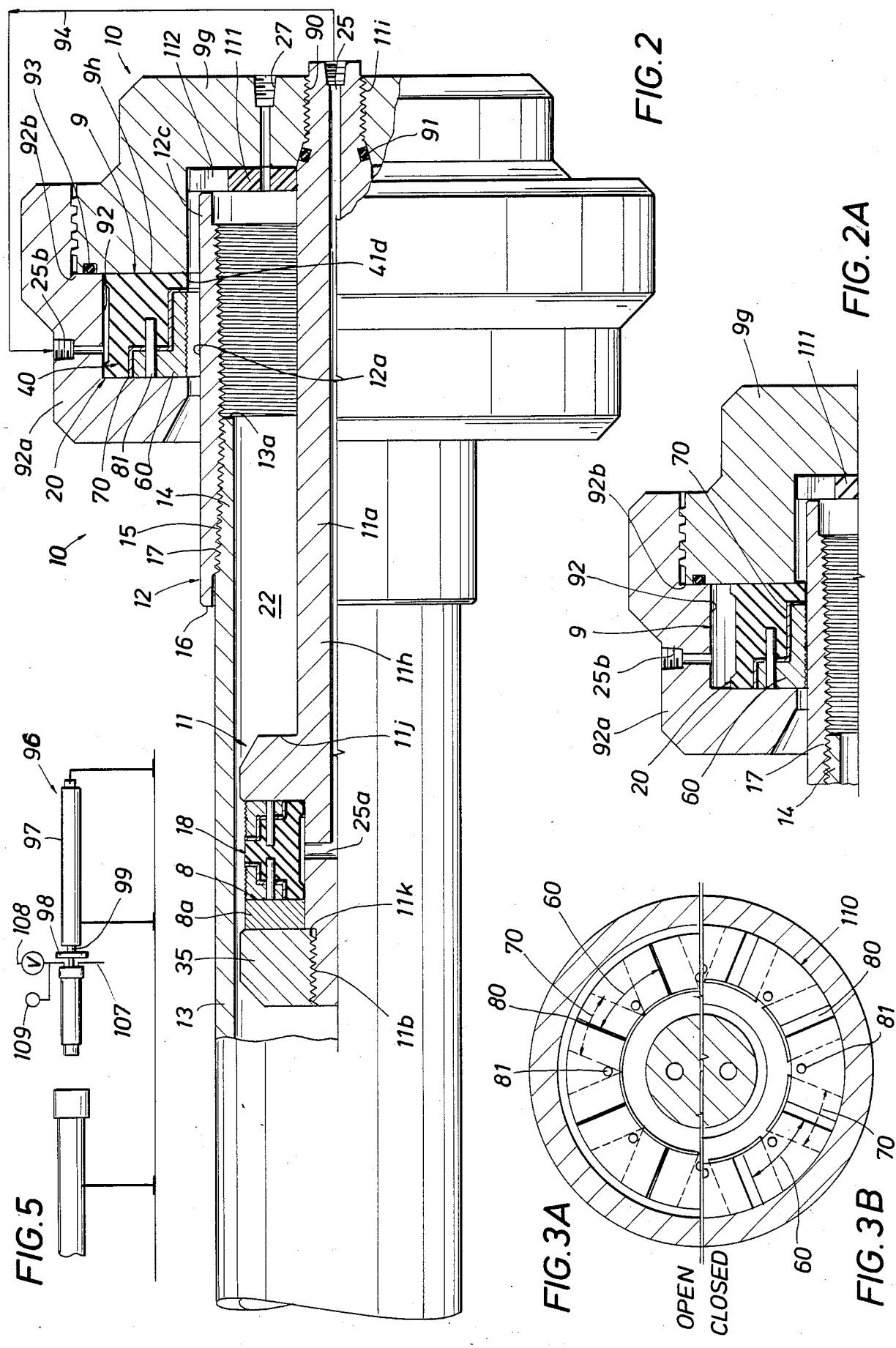

APPARATUS AND METHOD TO TEST A SINGLE CONNECTION BETWEEN A PIPE COUPLING AND A SINGLE PIPE END CONNECTED THEREWITH

CROSS REFERENCE TO RELATED APPLICATIONS

This application relates to my copending application Ser. No. 636,841 filed July 31, 1984 for "METHOD AND APPARATUS FOR HYDROSTATIC TESTING OF TUBULAR MEMBER" now abandoned and refiled as a continuation-in-part, Ser. No. 831,549, filed Feb. 25, 1986 for the same invention.

BACKGROUND OF THE INVENTION

1. Field of the Invention

The present invention relates to fluid, generally hydraulic, testing of a single connection between tubular members, and more specifically to a method and apparatus for pressure testing a single connection from the inside of a single pipe end to the exterior of a pipe coupling connected at one of its ends with the single pipe end. A body includes longitudinally spaced annular seal-lock ring segment assemblies for respectively sealingly engaging and locking with the interior of the pipe and with the pipe coupling threadedly engaged therewith to form a chamber across the single connection for receiving test fluid when the seal and lock ring segment assemblies are expanded into engagement with the pipe and pipe coupling. Fluid passage means are provided for conducting pressure fluid to expand the seal and lock ring segment assemblies into sealing engagement with the pipe end and pipe coupling and a second fluid passage is provided for communicating test fluid pressure to the chamber. The integrity of the threaded connection between the single pipe end and the pipe coupling is determined by visually noting leakage exterior of the pipe at the end of the pipe coupling, or by instrumentally noting a leakage by a decrease in the test pressure in the chamber when it is maintained under fluid pressure.

2. Description of the Prior Art

So far as known to Applicant, there has never been provided any type of arrangement for testing a single connection between a pipe end threadedly engaged in only one end of a pipe coupling for determining the integrity of the threaded connection. Ordinarily after a pipe coupling is threadedly engaged on a pipe end at the pipe mill, the threaded connection is tested. Quite often the pipe collar becomes partially dislodged from the pipe end during transport from the mill to its ultimate location for use. Heretofore, as pipe is run into the well bore, a joint of pipe is threadedly engaged with the other end of the pipe coupling, and the threaded connections at each end of the pipe coupling, that is the threaded connection termed the "mill end" and the just completed threaded connection on the rig floor, are simultaneously tested before lowering into the well. Most leaks which are discovered while testing in this manner as the pipe is run into the well occur on the so called "mill end"—that is, on the threaded pipe end on which the pipe coupling was initially engaged at the mill. It can be appreciated that substantial time and expense is incurred not only in testing for leaks in tubular connections as they are run into a well bore, but further substantial expense is incurred in attempting to correct such improperly threaded connections.

The present invention provides a relatively simple device which can be readily inserted into the single pipe end that is threadedly engaged at one end of a pipe coupling for sealing off therebetween and effecting a pressure test of the threaded connection between the single pipe end and the pipe coupling before it is placed on the rig floor to be run into the well. This operation cannot be performed on the rig floor after a tubular member has been threadedly connected into the other end of the pipe coupling, since at that time only both ends of the pipe coupling may be readily subjected to internal pressure testing and even then only under the conditions as they exist at the well location site.

It can be appreciated that the equipment presently utilized to test at the well site on a rig floor as the pipe is run into the well is substantial in size and is difficult to manipulate and position for each joint. Testing of threaded connections as the pipe is run into the well is done under substantial stress as it is desired to lower the pipe into the well bore as rapidly as possible to avoid any complications from any number of sources that can occur. It is always desirable to run the pipe as rapidly as possible to avoid sticking, and it can therefore be appreciated that it is desirable to conduct the test operations as quickly as possible. It would be difficult, if not impossible, to lower and properly locate a tool into a well pipe in a well bore to internally test only one end on the rig floor as the pipe is run into the well.

The present invention enables the single pipe end which is threadedly engaged with a coupling to be pressure tested before it is engaged with another tubular member and run into the well, which may reduce, if not eliminate, the need for testing the threaded connections between tubular members as they are run into the well and all the problems presently encountered with such procedure.

The present invention provides an apparatus for inserting in a pair of members having a single connection therebetween, which apparatus is provided with means to seal and lock the apparatus in position to form a sealed test chamber across the single connection and retain the apparatus in position even under test pressures up to or exceeding 15,000 psi and even where the members are of different diameter subjecting the apparatus to differential loading.

Other objects and advantages of the present invention will become more readily apparent from a consideration of the following description and drawings.

BRIEF DESCRIPTION OF THE DRAWINGS

FIG. 1 is a partial quarter sectional view illustrating an embodiment of the present invention;

FIG. 1A is a fragmentary sectional view illustrating one of the seal and lock ring segment assemblies of FIG. 1 in expanded position for sealing and locking with the threads inside of the coupling;

FIG. 2 is a partial sectional view illustrating an alternate embodiment of the present invention;

FIG. 2A is a fragmentary sectional view of one of the seal segment assemblies of FIG. 2 showing it when in sealed and locked relationship with the exterior of the pipe coupling;

FIG. 3A is a sectional view on 3A—3A of FIG. 1 which shows a partial plan view illustrating the position of the annular seal and lock ring segment assemblies during nonsealing and nonlocking engagement with the interior of a pipe or threaded pipe coupling;

FIG. 3B is a view to demonstrate the position of the seal and lock ring segment assemblies during sealing and locking with the interior of the pipe or a threaded pipe coupling;

FIG. 4 is a partial sectional view illustrating an alternate embodiment of the seal and lock ring segment assemblies of the present invention; and FIG. 5 is a schematic representation of an arrangement and method for employing the present invention.

DESCRIPTION OF THE PREFERRED EMBODIMENTS

Attention is first directed to FIGS. 1 and 2 of the drawings wherein the present invention is illustrated generally by the numeral 10 and is shown as including a body means referred to generally by the numeral 11 which is shown as positioned in the end of a single pipe 13 threadedly engaged at one end portion 14 by the threads 15 thereon and the threads 17 adjacent the end 16 of the pipe coupling referred to generally at 12. The body means 11 is provided with longitudinally spaced combination annular seal and lock ring assemblies referred to generally at 18 and 20 for sealing off the single pipe end 13 and the end 16 of the pipe coupling 12 threadedly engaged with the single pipe end 13 for forming a sealed chamber 22 extending between the single pipe end 13 and coupling 12 to receive test fluid, generally hydraulic, to test the single threaded connection formed by threads 15, 17 on the end of the single pipe 13 and the pipe coupling 12, respectively.

The pipe end 13 and coupling 12 are of different diameters and the sealed chamber 22 formed by the present invention extends across the single connection formed between the end 13d of the pipe in FIGS. 1 and 13a in FIG. 2 and the coupling 12 as shown in the drawings. The present invention is constructed so that even though the test pressure in chamber 22 creates a substantial reaction force due to the differential area between members 12 and 13 to tend to cause longitudinal movement of the body 11, such movement is prevented.

First fluid passage means 25 are provided in the body 11 for conducting fluid from a suitable source, not shown, to expand the seal and lock ring segments 18 and 20 into sealing relationship with the interior of the pipe end 13 and with the pipe coupling 12. A second fluid passage means 27 is provided in the body 11 for conducting hydraulic test fluid from a source, not shown, to the chamber 20 for testing the threaded connection formed between the single pipe end and the end 16 of the pipe coupling by threads 14, 17, as will be described in greater detail.

The body means 11 may be formed in any suitable manner and as illustrated, in FIG. 1 includes an elongated member 11a provided with threads 11b and 11c at its ends, respectively. The first and second fluid passage conducting means 25, 27 are formed in the longitudinally extending tubular body portion 11a as shown by any suitable means and passage means 25 include radial extensions 25a and 25b for communicating with the longitudinally spaced first and second groove means referred to generally at 8 and 9, respectively, formed in the body means 11 in any suitable manner.

In FIG. 1, the first annular groove means 8 is shown as being formed on the circumferential surface of the body portion 11' by means of the spaced rings 8a, 8b, with the ring 8b abutting the annular shoulder 8c formed at the juncture of the body portion 11 and the larger diameter body portion 11d as illustrated in FIG. 1. An annular spacer ring 11e of slightly larger internal diameter than the outer diameter of the portion 11d is provided which extends between and abuts the ring 8b as well as annular ring 9a which is spaced from 8 and abuts shoulder 20c formed at the juncture of body portion 11d with body portion 11g.

First annular groove means 8 is thus formed between the annular rings 8a and 8b and its bottom circumferential surface is defined by the peripheral surface 11f therebetween.

The second annular groove means 9 is formed by the annular ring 9a which abuts the shoulder 20c and the end of annular spacer ring 11e as shown and annular ring 9b which has between it and the ring 9a, the second seal and lock ring assembly 20 as shown. Assemblies 18 and 20 are maintained in first and second groove means 8 and 9 by abutting their respective rings 8a, 8b and 9a, 9b at each end. The rings 8, 8a, 9a and 9b as well as spacer ring 11e are maintained in position with seal and lock ring assemblies 8 and 20 in the grooves 8 and 9 by means of lock nuts 35, 35a threaded on body 11 at 11b and 11c as shown.

The rings 8a, 8b, 9a and 9b are provided with suitable seals thereon as shown to seal off the annular groove means 8 and 9 from the fluid passages 25, 27 and other parts of the tool.

The first seal and lock ring assembly 18 is shown as including an elastomer body 40 which body has a first circumferential surface referred to generally at 41 which in the FIG. 1 form faces the circumferential or peripheral surface of body portion 11' throughout the longitudinal extent of the groove means 8. A second circumferential surface on the body 40 is referred to generally at 40a and includes a first annular portion 41' for sealingly engaging the interior of the single pipe end, as will be described. A second annular portion referred to generally at 45 includes a substantially laterally extending surface 46 which is substantially vertical to the central longitudinal axis of the elastomer body 40. The second annular portion 45 also includes an annular surface 50a that may be termed horizontal or parallel to the central axis of the elastomer body. The vertical annular surface 46 and horizontal annular surface 50a are interconnected at their inner ends to form the step shaped surface referred to generally at 50. A second step shaped surface is formed by the intersection of the inner ends of surfaces 47 and 50b. It will be noted that the surfaces 50a and 47 are generally parallel to but radially spaced relative to the surface 41. The surfaces 50b and 46 are generally parallel, but spaced longitudinally in the elastomer body 40.

This arrangement provides a seating surface for the nonresilient annular segments 60 shown in solid line in FIGS. 3A and 3B. These may be termed primary segments and can be formed of metal. Secondary nonresilient segments which conform with the shape of the primary segments are illustrated at 70 and fit between the primary segments 60 and the stepped surface 50 on elastomer body 40. The secondary segments 70 are shown in dotted line at 70 in FIGS. 3A, 3B and span the circumferential space represented at 80 between adjacent primary segments 60. The segments 60 and 70 form a lock ring and backup for the elastomer annular seal 40 when such segments are both in the open or relaxed position as shown in FIG. 3A or when they have have been moved to an expanded position when the seal and lock ring segment assembly 18 has been moved into sealing and locking relationship as represented in FIG. 3B with the threads in coupling 12 as illustrated in FIG. 1A. The second seal and lock ring assembly 20 of FIG. 1 is similar in configuration to seal and lock ring assembly 18, but the primary segments 60a and secondary segments 70a are formed of plastic to deform along their outer peripheral surface when engaged against the threads 17 of the coupling 12 to thereby sealingly and lockingly engage therewith.

The outer surfaces of the primary metal segments may be serrated or configured to grippingly engage the interior of the single pipe end when expanded to lock and hold the body 11 of the tool of the present invention in position and against slipping during the pressure test. The elastomer body 40 may be split in two parts as illustrated at 55 in FIG. 1 and a suitable seal such as the O-ring seal 52 positioned in the grooves 53 in the resulting edge of the elastomer body which grooves face each other as demonstrated for receiving the annular O-ring seal 52 therein to seal off between the two elastomer body parts.

Suitable pins 81 which are engaged with the primary segments extend into openings provided in the elastomer elastomer seal 40, such pins 81 extending between the secondary segments 70 as more clearly demonstrated in FIG. 3 of the drawings.

The second seal and lock ring assembly 20 of FIG. 1 is similar in configuration to that of seal lock ring assembly 18; however, the primary segments 60a and secondary segments 70a are both formed of deformable material such as plastic or the like, as previously noted, so that when such segments are expanded into sealing relationship with the threads formed internally of the pipe coupling 12 as shown in FIG. 1A, they will deform to form threads 60b, 70b on their circumferential edges 60c, 70c to lockingly and sealingly engage with threads 17. The elastomer body 40 also conforms to threads 17 and seals therewith.

The elastomer seal and segment assembly 18 of FIG. 2 is similar to that previously described with regard to FIG. 1; however, the primary and secondary segments 60, 70 of the FIG. 2 form are also formed of metal and are provided with serrated surfaces for grippingly engaging with the exterior 12a of the pipe coupling 12 to assist in sealing and locking body 11 in position against the pressure in chamber 22 when the seal and lock ring segment assembly 20 is urged to sealing relationship with the pipe coupling.

In the FIG. 2 form, a body 11 again includes a tubular member designated in FIG. 2 as 11h which may be configured in any suitable manner to accomplish the desired results. It is shown as being threaded at one end 11i for threadedly engaging with the threads 90 of the cap 9g which fits over the pipe coupling end 12c to close off the end 12c thereof as well as the single pipe end 13a threaded thereinto. Suitable seal means 91 may be provided to provide proper seal between the body 11h threadedly connected with the cap 9g as shown. An annular flange 11j formed on the body 11h defines one end of the first annular groove means 8 and the other end is defined by the ring 8a held in position by the end lock cap 35 similar to that previously described. The end lock cap 35 abuts against shoulder 11k to limit the travel of cap 35 to properly space it from flange 11j to receive seal and lock ring assembly 18.

The second annular groove means 9 of the FIG. 2 form is defined by the end surface 9h of the cap 9g and by the inside annular surface 92 of the retaining cap 92a threadedly engaged with cap 9g as shown. The cap 92a is provided with a shoulder 92b which abuts the end 9h to space them a desired distance as shown and suitable seal means are provided as shown at 93 for inhibiting leakage therebetween.

The seal and lock ring segment assembly 20 in FIG. 2 is provided with an elastomer body 40 suitably configured to seal in groove 9 and move with segments 60 and 70 to seal body portion 41d against the exterior of a coupling 12. In the FIG. 2 form, the passage 25 is also communicated to the seal and lock ring assembly 20 by means of the conduit 94 connected to passage 25 and to passage 25b formed in the cap 92a as shown. The primary and secondary segments 60, 70 which form the ends and backup rings are similar to that described with regard to FIG. 1.

In using the form of either FIG. 1 or FIG. 2, the body 11 is inserted into the coupling 12 threadedly secured to the single end 13d in FIG. 1 and 13a in FIG. 2 of the pipe 13 by any suitable support means such as schematically shown and as referred to generally at 96 in FIG. 5. The support means includes a hydraulic cylinder 97 which is provided with a mounting bracket 98 on its piston rod 99 to enable the invention 10 to be connected therewith and moved internally of the single pipe end 13 and withdrawn when the test is complete. When positioned to test the single threaded connection between the single pipe 13 and coupling 12, it is positioned in the pipe and coupling as demonstrated in FIG. 1 of the drawings with the annular seal and lock ring segment assembly 18 positioned internally of and adjacent the end of the single pipe 13 end with the seal ring lock assembly 20 being positioned adjacent the threads formed internally of the coupling 12. Fluid may then be conducted through the passage 25 to move the elastomer body and seal and lock ring segment assemblies mounted thereon into sealing and locking relationship, respectively, with the inside of the single pipe end 13 and the inside of the threaded portion 17 of the coupling 12 as represented diagrammatically at 110 in FIG. 3B of the drawings. This provides a sealed chamber 22 extended across the single connection between the pipe and coupling between the seal means and lock ring segment assemblies 18 and 20 but which exposes the single end 13d of the pipe end portion 13 at the single threaded connection with the pipe coupling 12 for receiving hydrostatic pressure to test the single connection between the single end pipe 13 from the interior of the single end 13d of the pipe 13 to the exterior of the pipe coupling 12 at the end 16 thereof. The fluid for pressuring the seal and lock ring segment assemblies may be supplied from any suitable source through the line 107 as illustrated in FIG. 5 and the pressure fluid for filling the chamber may be supplied from any suitable hydrostatic source as represented at 108. A gauge 109 is provided which communicates with the sealed chamber 22 through supply line 108 and any decrease in pressure in the pressurized sealed chamber 22 will be reflected on the gauge indicating a leak in the connection of the single pipe end to the pipe coupling.

In employing the form of FIG. 2, it is mounted or positioned over the end of the pipe by any suitable means such as the arrangement illustrated in FIG. 5 and again hydrostatic pressure supplied to move the seal segment assemblies into sealing engagement with the interior of the pipe and with the exterior of the pipe coupling to provide the hydrostatic test chamber 22 across the single connection. It will be noted that in the FIG. 2 form, a suitable conduit 94 conducts fluid to the passage 25b for contracting the seal and lock ring segment assembly 20 to engage the exterior of the pipe coupling. After the pipe end 13d and pipe coupling 12 have been sealed off by lockingly and sealingly engaging each of the seal segments in the single pipe end and on the exterior of the pipe coupling, the chamber 22 may be supplied with hydrostatic pressure fluid through passage 27 in end cap 96 to test the threaded connection formed by the threads 15, 17 and between the single pipe end 13 and the pipe coupling 12. If there is a leak, this may be either visually noted by liquid passing out the end 16 of the coupling 12 between the coupling and the exterior of the pipe, or by instrumentally noting same by means of the pressure gauge as previously described. The chamber 22 in the FIG. 2 form extends from the inside of the end of pipe 13 to communicate with the exterior of coupling 12 as shown.

This test more nearly simulates actual well conditions wherein the pressured well fluid attempts to escape from the interior of the production string to the exterior thereof through the threads joining the pipe 13 and pipe coupling 12.

The nonresilient metal segments 60 along with the nonresilient metal segments 70 form an annular retainer ring or wall at each end of the elastomer body 40 to inhibit extrusion thereof from the first annular groove 8 as well as extrusion of the first annular portion 41' when hydrostatic pressure is supplied to force the seal and lock ring assembly 18 into sealing and locking engagement with the interior circular wall of pipe end 13 in the FIGS. 1 and 2 form.

The nonresilient segments 60 and 70 have arcuate inner surfaces thereon which are serrated as are the arcuate surfaces of the nonresilient metal segments 60 and 70 in the first seal and lock ring assembly 18 to inhibit extrusion of the elastomer body 40 at one end thereof when pressure is applied thereto to move the seal and lock ring assembly 20 into sealing and locking relationship with the outer circumferential surface of the coupling 12 as shown in FIG. 2. Similarly, the rigid, deformable plastic segments 60a, 70a of the second seal and lock ring assembly 20 of FIG. 1 inhibit extrusion of the elastomer body 40 and the annular sealing portion 41b thereof when the segments are lockingly and sealingly engaged with the threads 17 internally of the coupling of the FIG. 1 form as more clearly illustrated in FIG. 1A.

The present invention shown in FIG. 2 of the drawings is constructed so that the chamber 22 communicates with one end or side of the annular portion 41d of body 40 so that the pressure in chamber 22 counterbalances the tendency of the elastomer body 40 to extrude into the chamber. In FIG. 1A, it can be seen that the end of the chamber 22 communicates around the outer end of ring 9a with the annular edge or end portion 40g of the first annular portion 41b of elastomer body 40 to inhibit extrusion.

In the FIG. 2 form, a bumper plate 111 of plastic or other material to protect the pipe end and threads against damage is mounted on the inner end of cap 9g by any suitable means. It is provided with circumferentially spaced openings 112 on the outer edge thereof to communicate the chamber 22 therethrough with the first annular portion 41d which sealingly engages the outer surface of the coupling 12 when the seal and lock ring assembly 20 is moved into engagement with the exterior of the coupling 12 as previously described.

In FIG. 4, the first annular seal and lock ring segment assembly 18 is shown as comprising an elastomer body 40 of one piece. It is represented by the numeral 120 and has a generally inverted "L" shape to provide a first annular portion 41' and a second annular portion referred to generally at 45. The second annular portion 45 is configured similar to that previously described to provide a seating surface for the nonresilient annular segments 60 and 70 on the elastomer body 40 with the pins 81 positioned as previously described.

FIGS. 3A, 3B are views of the seal-lock ring assembly 20 of the FIG. 1 form showing such assembly, respectively, in open or nonsealing, nonlocking and closed or sealing and locking relationship with the interior of the threaded coupling. When the seal-lock ring assembly 18 of FIGS. 1 and 2, or the seal-lock ring assembly 20 of the FIG. 1 form, is actuated, such seal-lock ring assemblies expand into sealing and locking engagement inside the pipe and coupling.

When the seal-lock assembly is arranged to expand to seal-lock relationship inside the pipe or coupling, the space 80 between adjacent primary segments is initially narrow as shown in FIG. 3A, and then the space 80 widens as the seal-lock assembly expands to seal-lock or closed position inside the pipe or coupling as shown in FIG. 3B. When the seal-lock assembly 20 of FIG. 2 is in open, or nonsealing and nonlocking relationship relative to the exterior of the pipe coupling 12 the space 80 is initially wide and then becomes narrow as fluid pressure moves the seal-lock assembly 20 to seal and lock with the exterior of the pipe coupling 12. The space 80 in the latter situation is the reverse of that shown in FIGS. 3A and 3B.

The FIG. 2 form eliminates any contact of the seal-lock assembly with the threaded portion of coupling 12, yet provides a fluid test chamber to simulate well conditions between the single pipe end and its single connection with the coupling. The test chamber 22 in such event extends from the interior of the end of pipe 13 through the coupling or connector to communicate with the exterior of the coupling as shown.

The term "fluid" contemplates the use of liquid or gas as the test medium.

The foregoing disclosure and description of the invention are illustrative and explanatory thereof, and various changes in the size, shape and materials as well as in the details of the illustrated construction may be made without departing from the spirit of the invention.

I claim:

1. In apparatus to test the threaded connection between a pipe coupling and a single pipe end threadedly engaged in one end thereof;
    body means for positioning inside the pipe end and adjacent the pipe coupling engaged therewith;
    said body means including:
        first and second annular groove means longitudinally spaced along said body means;
        first and second, longitudinally spaced annular seal and lock ring segment assemblies in the first and second groove means, respectively, said first and second annular seal and lock ring segment assemblies movable radially of said body means to sealingly engage and lock, respectively, with the pipe end and the pipe coupling to form a fluid receiving chamber which communicates the interior of the single pipe end with the pipe coupling in which it is threaded;

first fluid passage means for conducting fluid to move said first and second seal and lock segment assemblies into sealing and locking engagement with the pipe and pipe coupling, respectively, to form the fluid receiving chamber; and second fluid passage means in said body means for conducting fluid to the chamber for testing the threaded connection between the single pipe end and the pipe coupling from the inside of the pipe end to the outside of the pipe coupling through the single threaded connection therebetween.

2. The apparatus of claim 1 wherein said first and second annular seal and lock ring segment assemblies engage, respectively, the inside of the pipe end and the threaded portion of the pipe coupling spaced from the single pipe threadedly engaged therein.

3. The apparatus of claim 2 wherein the seal and lock ring segment assembly that engages the pipe coupling threaded portion comprises:

an annular elastomer body with deformable lock ring segments thereon to form a reinforcing and lock ring for said elastomer body which provides a surface that engages the threaded portion and lockingly conforms with the thread configuration on the pipe coupling;

pin means engaging said deformable segments with said elastomer body to move said segments when said body is moved to seal with the threaded pipe coupling; and secondary backup segments between said deformable segments and elastomer body to inhibit extrusion of said elastomer body between said deformable lock ring segments as said elastomer body expands to sealing position.

4. The apparatus of claim 1 wherein said first and second seal and lock ring segment assemblies engage, respectively, the inside of the pipe end and the outside of the pipe coupling spaced from the end thereof with which the single pipe end is threadedly engaged.

5. The apparatus of claim 1 or 4 wherein said body means is closed at one end for abutting with the pipe coupling.

6. The apparatus of claims 1 or 4 wherein said seal and lock ring segment assemblies include:

an annular elastomer body having a first circumferential surface extending throughout the longitudinal extent of the annular groove in said body means and exposed to the fluid pressure from the first fluid passage means for moving said seal and lock ring segment assemblies to sealing and locking position with the pipe and pipe coupling;

a second circumferential surface having a first annular portion for sealingly angaging the pipe and pipe coupling and a second annular portion with a substantially vertical and horizontal surface interconnected at their inner ends by a projecting, generally stepped shape surface therebetween;

primary nonresilient, annular segments of generally inverted "L" shape to seat on the stepped shape of said elastomer seal member to form a reinforcing and lock ring for said elastomer body;

secondary nonresilient, annular segments between said primary segments and second annular portion, said secondary segments spanning the circumferential space between adjacent primary segments; and pin means mounting said primary segments on said second circumferential surface for movement therewith.

7. The apparatus of claim 6 wherein said pin means extend into said elastomer seal member between adjacent secondary segments.

8. Apparatus to seal and secure in position in a single pipe end and pipe coupling threadedly engaged therewith for testing the single threaded connection between the pipe end and pipe coupling for leaks, comprising:

body means for inserting in the single pipe end and pipe coupling engaged therewith;

seal and lock ring segment assemblies longitudinally spaced on said body means to sealingly and lockingly engage in the single pipe end and with the pipe coupling intermediate the ends thereof to secure said body means in the single pipe end and with the pipe coupling for forming a sealed chamber therebetween to receive test fluid to test the single threaded connection between the single pipe end and pipe coupling for leaks;

first fluid passage means in said body means for conducting fluid to move said seal and lock ring segment assemblies into sealing and locking relationship with the single pipe end and the pipe coupling to secure said body means in the single pipe end with the pipe coupling; and second fluid passage means to conduct test fluid to the chamber between said seal and lock ring segment assemblies for testing the single threaded connection between the pipe end and pipe coupling for leaks.

9. A method of sealing and locking between connected tubular members a test tool having spaced seal-lock assemblies to test the connection between the tubular members comprising the steps of:

inserting the test tool in the tubular members so that one of the seal-lock assemblies may seal and lock with one of the tubular members and the other seal-lock assembly may seal and lock with the other tubular member;

conducting fluid to the seal-lock assemblies to seal and lock them with the tubular members to form a sealed chamber therebetween;

conducting fluid to the sealed chamber to test for leaks in the connection; and releasing the fluid from the seal-lock assemblies to unlock the seal-lock assemblies from the tubular members for removal of the test tool therefrom.

10. Apparatus to seal and secure a test tool to tubular members to test a connection between the tubular members comprising:

body means for positioning in the tubular members;

seal and lock assemblies longitudinally spaced on said body means to seal and lock with the tubular members and form a sealed chamber with the connection to be tested therein;

first fluid passage means for conducting fluid to move said seal and lock assemblies into sealing and locking relationship with the tubular members to secure said body means to the tubular members and to enclose the connection in the chamber; and second fluid passage means to conduct test fluid to the sealed chamber to test the connection between the tubular members.

11. The apparatus of claim 1, 3 or 8 including instrument means associated with said second fluid passage means to instrumentally determine a leak from the chamber by a pressure drop in said second fluid passage means when said seal and lock assemblies are sealed and locked to form the chamber and the chamber is filled with test fluid.

12. The apparatus of claim 10 wherein the chamber formed by said spaced seal and lock assemblies extends from the inside of one of the tubular members to the exterior of the other tubular member.

* * * * *